(12) United States Patent
Olson et al.

(10) Patent No.: US 8,364,361 B2
(45) Date of Patent: Jan. 29, 2013

(54) TRANSMISSION CLUTCH CONTROL APPARATUS AND METHOD

(75) Inventors: Bret M. Olson, Canton, MI (US);
Robert L. Moses, Ann Arbor, MI (US);
Randall B. Dlugoss, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1386 days.

(21) Appl. No.: 12/030,978

(22) Filed: Feb. 14, 2008

(65) Prior Publication Data

US 2009/0209383 A1 Aug. 20, 2009

(51) Int. Cl.
*B60W 10/02* (2006.01)
(52) U.S. Cl. ............ 701/60; 701/58; 701/64; 701/66; 701/67; 477/166; 477/174; 477/175; 477/180
(58) Field of Classification Search ............ 701/51, 701/58, 60, 64, 66, 67; 477/70, 86, 166, 477/174, 175, 180
See application file for complete search history.

(56) References Cited

U.S. PATENT DOCUMENTS

| | | | | |
|---|---|---|---|---|
| 4,707,789 A * | 11/1987 | Downs et al. | | 701/58 |
| 5,058,460 A * | 10/1991 | Hibner et al. | | 477/154 |
| 5,119,695 A * | 6/1992 | Milunas et al. | | 477/98 |
| 5,211,079 A * | 5/1993 | Runde et al. | | 477/61 |
| 5,343,994 A * | 9/1994 | Kyrtsos | | 192/85.63 |
| 5,795,262 A * | 8/1998 | Robinson | | 477/92 |
| 5,902,344 A * | 5/1999 | Eike et al. | | 701/67 |
| 6,101,438 A * | 8/2000 | Staiger et al. | | 701/55 |
| 6,216,074 B1 * | 4/2001 | Hillman et al. | | 701/51 |
| 6,285,942 B1 * | 9/2001 | Steinmetz et al. | | 701/67 |
| 6,292,732 B1 * | 9/2001 | Steinmetz et al. | | 701/67 |
| 6,332,860 B1 * | 12/2001 | Hubbard et al. | | 477/143 |
| 6,464,609 B1 * | 10/2002 | Bai et al. | | 475/116 |
| 6,526,343 B2 * | 2/2003 | Saito et al. | | 701/51 |
| 6,595,898 B2 * | 7/2003 | Kobayashi et al. | | 477/174 |
| 6,640,950 B2 * | 11/2003 | Harvey et al. | | 192/85.01 |
| 6,915,890 B1 * | 7/2005 | Whitton et al. | | 192/85.63 |
| 7,440,833 B2 * | 10/2008 | Chen | | 701/51 |
| 7,731,630 B2 * | 6/2010 | League et al. | | 477/155 |
| 7,850,572 B2 * | 12/2010 | Hwang et al. | | 477/86 |
| 2008/0076634 A1 * | 3/2008 | Chen | | 477/174 |
| 2008/0228364 A1 * | 9/2008 | Osselaere et al. | | 701/67 |

* cited by examiner

*Primary Examiner* — Thomas Black
*Assistant Examiner* — Peter D Nolan
(74) *Attorney, Agent, or Firm* — Quinn Law Group, PLLC

(57) ABSTRACT

A method for controlling a clutch assembly includes controlling an actual clutch fill pressure using open-loop pressure controls when an active fill phase is detected, and using closed-loop pressure controls when the active fill phase is complete or when an overfill condition is detected. The method supplies the actual clutch pressure according to a second set of open-loop pressure controls when a step in commanded clutch pressure is detected. The method monitors a fill pressure and time during the step, and applies the clutch pressure according to the closed-loop pressure controls when either value equals a corresponding threshold value. A clutch assembly has a piston for compressing clutch disks to initiate a shift event, an algorithm for controlling the shift event, and a sensor for determining an actual clutch pressure during the shift phases. The algorithm switches between closed-loop and open-loop pressure controls in response to different shift phases.

13 Claims, 4 Drawing Sheets

TRANSMISSION CLUTCH CONTROL APPARATUS AND METHOD

TECHNICAL FIELD

The present invention relates to an apparatus and method for improving the performance of a clutch assembly during an active fill phase and a large commanded clutch pressure step using both open-loop and closed-loop pressure control logic as determined by a detected clutch response and shift phase of the clutch assembly.

BACKGROUND OF THE INVENTION

A motor vehicle transmission generally includes a number of gear elements coupling an input shaft and an output shaft, and also includes a number of torque-transmitting devices or clutches that may be selectively engaged to activate certain gear elements and establish a desired speed ratio between the input and output shafts. As used herein, the term "torque-transmitting device" will be used collectively to refer to all clutches, including braking clutches as well as rotating clutches.

Shifting from one speed ratio to another is performed in response to engine throttle level and vehicle speed, and generally involves releasing or disengaging a clutch associated with the current speed ratio, i.e. the off-going clutch, and applying or engaging a clutch associated with a desired new speed ratio, i.e. the on-coming clutch. The term "speed ratio" is defined as the transmission input speed or torque converter turbine speed divided by the transmission output speed. Thus, a low gear range has a high speed ratio while a high gear range has a lower speed ratio.

A shift made from a high speed ratio to a lower speed ratio is referred to commonly and herein as an "upshift". In the type of transmission involved within the scope of this invention, such an upshift is accomplished by disengaging a clutch associated with the higher speed ratio and engaging a clutch associated with the lower speed ratio, to thereby reconfigure the gear set to operate at the lower speed ratio. Shifts performed in the above manner are termed "clutch-to-clutch" shifts, and require precise timing in order to achieve optimal quality shifting, and to tend to reduce a perceptible delay in the shift event.

Conventional transmissions use various compliance devices such as accumulators, wave plates, springs, and orifices, as well as an applied hydraulic line pressure, to control the shift event. The quality of a particular shift event, and in particular the minimization of a delay in executing the shift, depends on rapid cooperative operation of several clutch functions, such as pressure changes within the respective apply chambers of the on-coming and off-going clutch apply chambers, and the timing and control of the various compliance devices.

In clutch-to-clutch systems, single clutches may perform multiple clutch functions. For example, one clutch may handle low torque, closed-throttle downshifts while remaining capable of handling a high torque upshift. A high torque upshift may require rapid pressurization or fill of the clutch chamber while overcoming compliance to rapidly initiate a desired speed ratio change, which in some circumstances may lead to less than optimal upshift delays.

SUMMARY OF THE INVENTION

Accordingly, a method is provided for controlling a clutch assembly, including detecting an active fill phase of the clutch assembly, controlling an actual clutch fill pressure for the clutch assembly according to a first set of open-loop control logic when the active fill phase is detected, and detecting an actual end-of-fill (EOF) event representing a completion of the active clutch fill phase. The method controls an actual clutch pressure using closed-loop control logic when the actual EOF event is detected, and when a large step or pressure instability is not detected.

In one aspect of the invention, the method detects a step in commanded clutch pressure after the actual EOF event is detected, compares the step to a threshold value, and supplies the actual clutch pressure according to a second set of open-loop control logic when the commanded step exceeds the threshold value.

In another aspect of the invention, the method monitors a fill pressure and a fill time during the step, and supplies the clutch pressure according to the closed-loop control logic after at least one of the fill pressure and fill time equals a corresponding threshold value.

In another aspect of the invention, the method detects an overfill condition of the clutch assembly, and ends the active fill phase when the overfill condition is detected using a pressure sensor. The method then updates a set of clutch fill parameters for controlling a subsequent active fill phase by adjusting at least one of a fill time and a fill pressure of the clutch assembly.

In another aspect of the invention, the method compares the actual and commanded clutch pressures during a torque phase or an inertia phase to thereby detect a pressure anomaly, corrects the pressure anomaly using a predetermined pressure anomaly correction method selected from the group consisting of switching to a third set of closed-loop control variables, requesting a corrective action from a large transmission control algorithm, and limiting an error accumulation within the closed-loop pressure controls, and then switches from the predetermined anomaly correction method to the closed-loop pressure controls when the pressure anomaly is corrected.

In another aspect of the invention, a method is provided for optimizing a performance of a clutch assembly. The method controls an actual clutch pressure according to set of clutch fill parameters during an active fill phase of the clutch assembly, with the set of clutch fill parameters defining a first set of open-loop pressure control variables. The method also detects a presence of an actual end-of-fill (EOF) condition representing an end of the active fill phase, calculates or determines a required or predicted end-of-fill (EOF) event during the active fill phase, and switches from the set of clutch fill parameters to closed-loop pressure controls in response to the actual EOF condition or the predicted EOF condition.

In another aspect of the invention, a clutch assembly has at least one clutch pack having a plurality of clutch disks, an apply piston for compressing the plurality of clutch disks to initiate a shift event, a controller having an algorithm for controlling the shift event through a plurality of shift phases including an active fill phase, a torque phase, and an inertia phase, and a sensor for determining an actual clutch pressure during each of the plurality of shift phases. The algorithm switches between a set of closed-loop pressure controls and at least one set of open-loop pressure controls in response to one of the shift phases.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
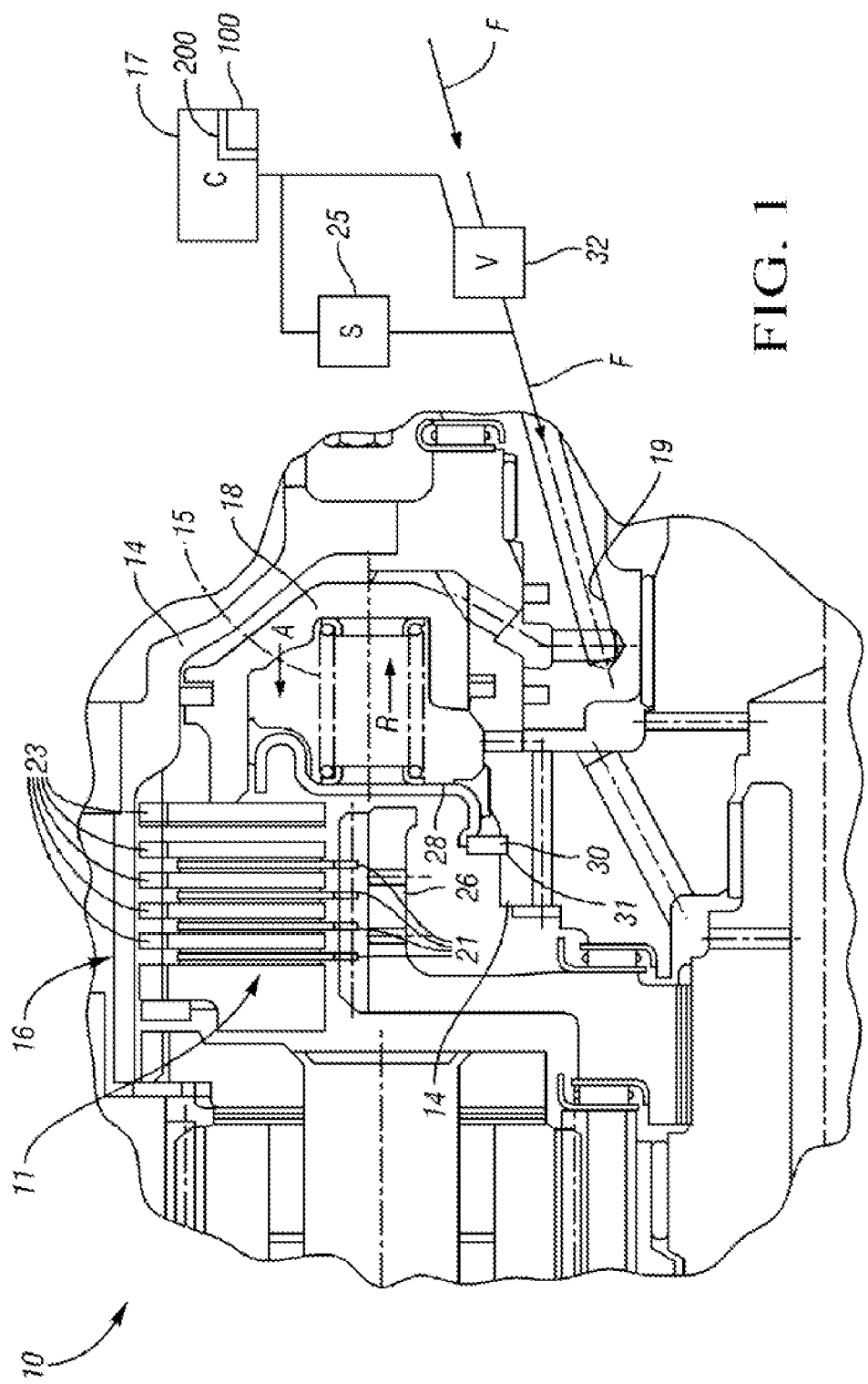
FIG. 1 is a fragmentary cross-sectional illustration of a clutch assembly usable with the method or algorithm of the invention.

Referring to the drawings, wherein like reference numbers refer to like components, and beginning with FIG. 1, a clutch assembly 10 operable for transferring torque within a transmission (not shown) includes a clutch pack 11 that is disposed within a clutch housing 14. In the representative clutch assembly 10 of FIG. 1, the clutch housing 14 is splined at 16 to receive the clutch pack 11, although a separate member, such as a clutch drum or another clutch member, may be used in place of the clutch pack 11, as will be understood by those of ordinary skill in the art. The clutch pack 11 has a plurality of clutch plates 23 and a plurality of friction plates 21, and additional clutch assemblies 10 may be used in an automatic transmission, or within a dual-clutch transmission, as needed. Regardless of the number of clutch assemblies 10 used in the clutch assembly 10, the operation of the clutch pack 11 is generally described hereinbelow.

The clutch plates 23 are interposed between the various friction plates 21, which are splined to a clutch hub 26 or other selectively rotatable member of the transmission (not shown). The clutch plates 23 and the friction plates 21 may be selectively engaged by an apply piston 18 or another clutch-apply device. The clutch assembly 10 further includes a return spring 15 disposed between the apply piston 18 and a balance piston 28, with the return spring applying a return force to the apply piston 18 in the direction of arrow R. An external retaining ring 30, which may also be adapted for retaining the balance piston 28, is disposed within a retainer groove 31 that is defined by the clutch housing 14.

The clutch assembly 10 is in communication with and controllable by an integrated control unit or controller 17, also labeled "C", which is configured to include a larger transmission control algorithm 200. The controller 17 is programmed with or otherwise includes a pressure control method or algorithm 100, as will be described below with reference to FIG. 5. The algorithm 100 of the invention described herein may be configured as a portion of the overall transmission control algorithm 200. As will be understood by those of ordinary skill in the art, this larger transmission control algorithm 200 has the overall authority in shift states/phases, commanded pressure profile, etc. Therefore, given other transmission inputs such as turbine speed, the pressure control, and therefore the progression through the algorithm 100, can be modified, changed, and/or aborted as required by the larger transmission control algorithm 200 as needed. The steps detailed in algorithm 100 are for the control of pressure-related events, but EOF, underfill, and/or overfill conditions can also be checked and verified by alternative non-pressure sensor related inputs. Examples of additional inputs to the algorithm 100 include turbine speed and output speed which are constantly monitored in order to properly diagnose the state of the transmission (not shown) having a clutch assembly 10 (see FIG. 1), and can aid in the proper progression through the algorithm 100.

The controller 17 is in direct or indirect/wireless communication with a fluid control device or valve 32 and at least one sensor 25, also respectively labeled "V" and "S" in FIG. 1. The optimal location of the sensor 25 is downstream of the valve 32 in a location with few restrictions between the sensor 25 and the clutch assembly 10. This location could be located in the clutch assembly 10, or in a valve body assembly (not shown) thereof, as long as the sensor 25 is measuring actual clutch pressure. The valve 32 is configured for selectively admitting or preventing a flow of pressurized fluid, represented by the arrows F, from a pump (not shown). The valve 32 may be, for example, a solenoid-operated fluid control valve, but within the scope of the invention may include any other suitable fluid control device or valve generally characterized as being either of the on/off or modulated type, as well as a single or 2-stage device, i.e. a variable bleed solenoid with a regulator valve.

Each shift from one speed ratio to another includes an active "fill" phase or a clutch preparation phase during which an on-coming clutch is filled with pressurized fluid in preparation for torque transmission. The pressurized fluid compresses an internal return spring, such as the return spring 15 shown in FIG. 1, thereby stroking a clutch apply piston, such as the apply piston 18. Once sufficiently filled, the apply piston 18 applies a clutch apply force to the clutch plates 23 and friction plates 21 in the direction of arrow A, thus developing a torque capacity exceeding the return force (arrow R) of the return spring 15. Thereafter, the clutch assembly 10 may transmit torque in relation to a clutch apply pressure, and the entire shift event may be completed using various control strategies and methodologies. The usual control strategy involves commanding a high level of on-coming clutch apply pressure, generally at a level above a pressure level required for compressing a return spring, for an empirically determined desired fill time, and then proceeding with the subsequent phases of the shift event, i.e. the torque phase, inertia phase, and the torque-holding phase. The volume of fluid required to fill a clutch and stroke the return spring and thereby cause the clutch assembly to gain torque capacity is referred to as the "clutch volume."

Figure 2:
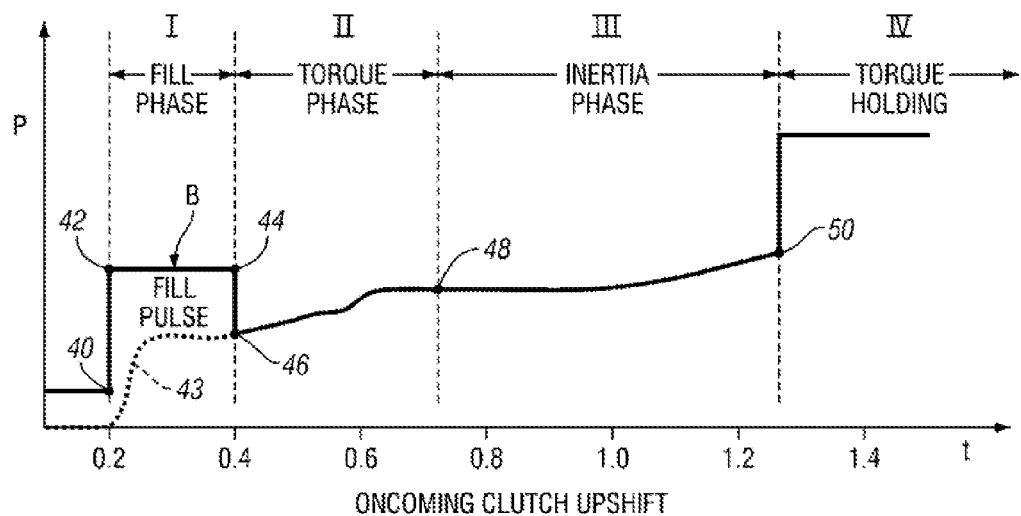
FIG. 2 is a schematic line graph describing various operating phases of a clutch assembly.

Referring to FIG. 2, various operating or shift phases are associated with a representative oncoming clutch shift, such as the upshift shown in FIG. 2. The shift phases include a fill phase (Phase I), as described above, as well as a torque phase (Phase II), an inertia phase (Phase III), and a torque holding phase (Phase IV), each of which will be understood by those of ordinary skill in the art. During the fill phase (I), the line B represents the commanded fill pressure, which is typically a calculated clutch fill pressure delivered as a fill pulse or pressure command to a valve such as the valve 32 of FIG. 1.

Referring briefly to both of FIGS. 1 and 2, the actual fill pressure (line 43 of FIG. 2) is the pressure under which pressurized fluid (arrow F of FIG. 1) exits the valve 32 of FIG. 1 and enters a fluid path 19, with the actual fill pressure also being directly measurable by the sensor 25, whether at the exit of the pressure control device or within a clutch apply chamber of the clutch assembly 10. The actual fill pressure may be expected to vary from the commanded fill pressure due in part to the time response of the various compliance components of the clutch assembly 10, leakage in the fluid path 19, and any centrifugal effects from a rotating clutch. As used hereinafter, the line B of FIGS. 2, 3, and 4 refers to a commanded fill pressure or fill pulse when occurring during an active fill phase (Phase I), and to a commanded apply pressure when occurring during any other shift phase (Phases II, III, and IV).

An actual fill pressure (line 43) that is less than the required clutch pressure ($P_1$) for completely compressing the return spring 15 (see FIG. 1) is referred to hereinafter as an "underfill" event. That is, an underfill event occurs when a clutch is insufficiently filled with pressurized fluid in order to completely compress the return spring 15 (see FIG. 1) and start the torque transfer across the various plates 21, 23 of the clutch pack 11 (see FIG. 1). Likewise, an "overfill" event occurs when the clutch is filled to an actual fill pressure in excess of the required EOF pressure ($P_1$), and the torque transfer event occurs prematurely, as each of these conditions will be described below with reference to FIGS. 3 and 4.

Referring again to FIG. 2, when a shift event is initiated, the commanded fill pressure (line B) steps from a minimal or initial level at point 40 to the stepped level of point 42, with this commanded pressure step or "fill pulse" ideally held for the duration of the fill event, i.e. to point 44. Once the active fill event is determined to be complete, a point referred to hereinafter for simplicity as the predicted end-of-fill (EOF) event regardless of whether the active fill event results in an overfill or underfill condition, the commanded fill pressure transitions to point 46 in preparation for the torque phase. In an ideal clutch fill event as shown in FIG. 2, the commanded fill pressure is equal to the required fill pressure ($P_1$) at point 46, i.e. there is no overfill or underfill of the clutch. In other words, in the ideal shift event of FIG. 2, the "actual EOF" event occurs exactly when predicted or required at point 46. The clutch assembly 10 enters the torque phase until approximately point 48, followed by the inertia phase. Slippage is controlled through both the torque and the inertia phases, until the shift event is completed and torque is held, beginning at approximately point 50.

Figure 3:
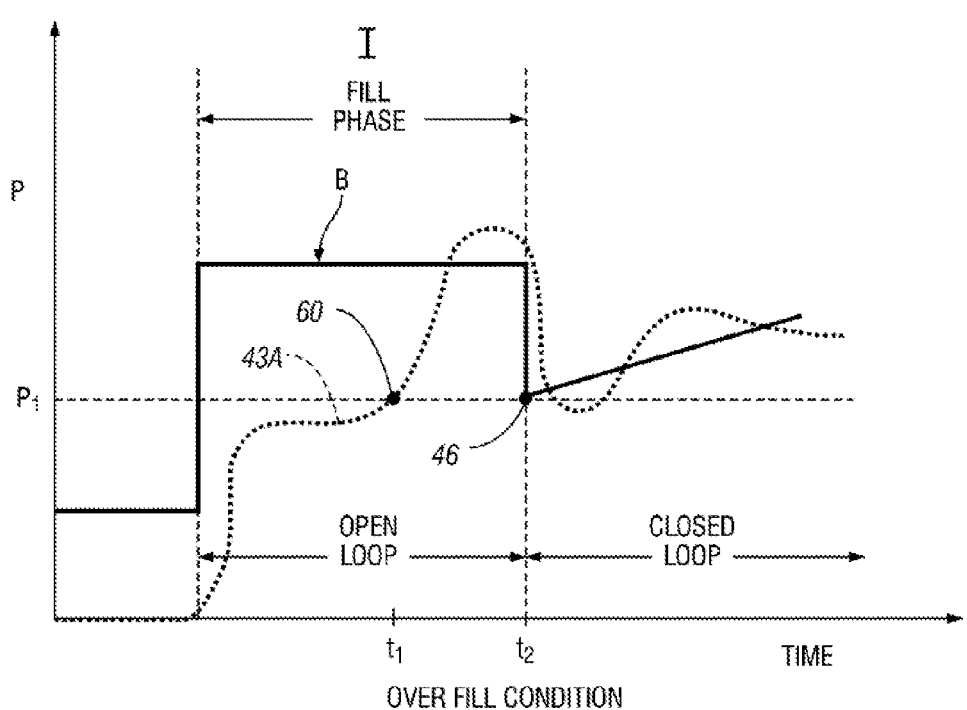
FIG. 3 is a schematic line graph describing an overfill condition of a representative clutch assembly.

Referring to FIG. 3, an overfill event or condition is shown for a representative active fill phase. An active fill phase may be controlled using the commanded fill pressure (line B) as an open-loop pressure control variable. Open-loop controls, which are also referred to as non-feedback controllers due to the inherent absence of a feedback loop for observing the output of any processes controlled by the open-loop controls, allows for a relatively rapid control response. Under certain conditions, however, the actual fill pressure (line 43A) may quickly ramp to a level exceeding the required EOF pressure ($P_1$). For example, in FIG. 3, the actual fill pressure (line 43A) reaches the required EOF pressure ($P_1$) at point 60, and the actual EOF event is achieved. However, the required EOF pressure ($P_1$) is not calculated or predicted to occur until point 46 by the open-loop portions of algorithm 100 of FIG. 5 as described below. In other words, the clutch is actually sufficiently filled at time=$t_1$, when the EOF event is not predicted to occur until a later time=$t_2$. As the amount of overshoot of the actual fill pressure (line 43A) over the required EOF pressure ($P_1$) increases, a correspondingly large control error is generated, and torque transfer begins.

Figure 4:
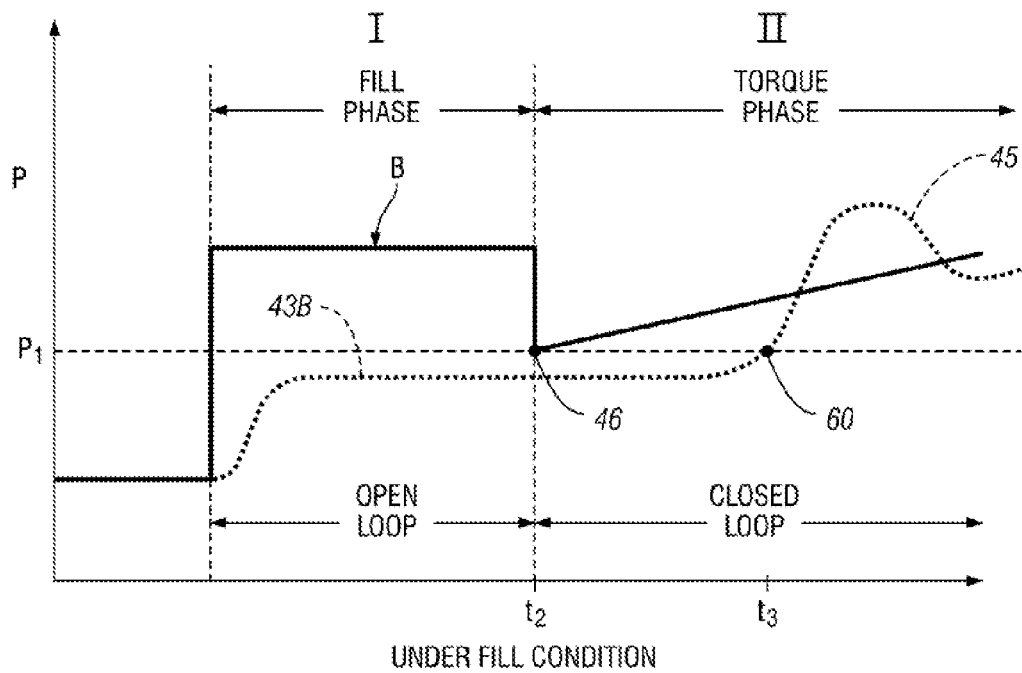
FIG. 4 is a schematic line graph describing an underfill condition of a representative clutch assembly.
Figure 5:
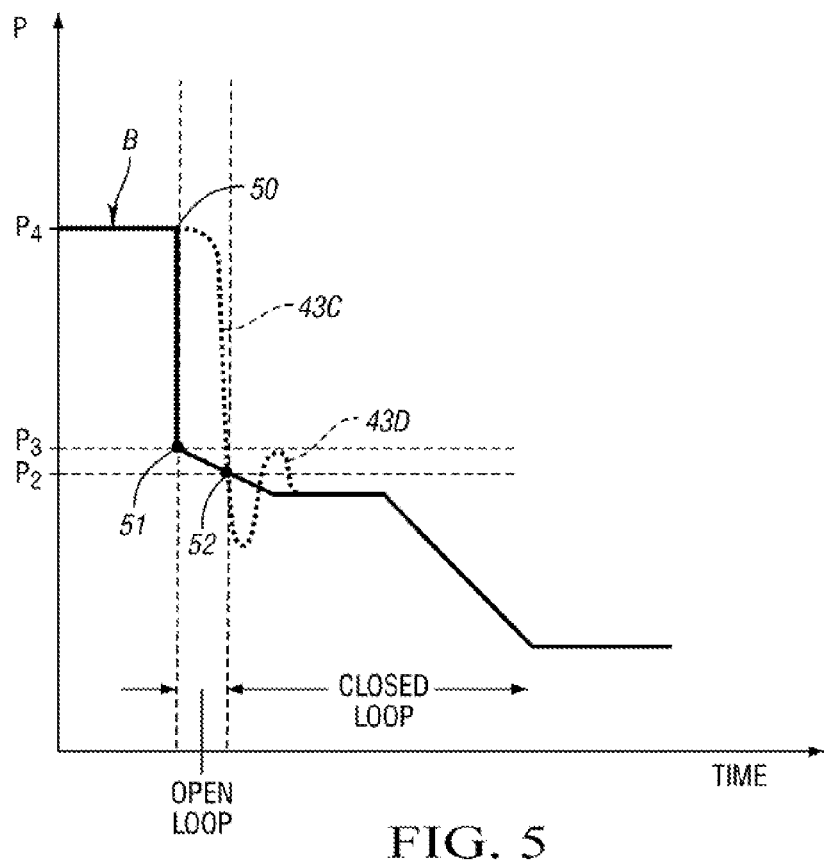
FIG. 5 is a schematic line graph describing a large step event of a representative clutch assembly.

To counter this error, the method or algorithm 100 shown in FIG. 1, which will be described in detail later hereinbelow with reference to FIG. 5, is accessible by the controller 17 (see FIG. 1), wherein the clutch assembly 10 (see FIG. 1) is controlled during an active fill phase (Phase I) using an open-loop set of pressure control logic. The sensor 25 (see FIG. 1) then detects the required EOF pressure ($P_1$) characterizing the actual EOF event (point 60 of FIGS. 3 and 4) and an imminent or current completion of the next active fill phase (phase I), and the commanded pressure profile will transition to the next phase as commanded by the algorithm 100 (see FIG. 5). Upon detecting the actual EOF event at point 60, the clutch assembly 10 (see FIG. 1) is controlled using a separate set of closed-loop control logic for adapting or correcting the actual clutch apply pressure.

Referring to FIG. 4, a clutch underfill event is shown as actual clutch pressure 43B that is less than the required EOF fill pressure ($P_1$) corresponding to the actual EOF clutch fill event (point 60), such as may result in a highly compliant system, and/or one with a relatively high clutch volume in which the open-loop pressure controls improperly predict the EOF event (i.e. point 46). That is, in contrast to the overfill condition of FIG. 3, in FIG. 4 the predicted EOF event, point 46, occurs before the actual fill pressure (line 43B) reaches the required EOF pressure ($P_1$) at point 60. That is, the actual clutch pressure (line 43B) does not first reach the required EOF pressure ($P_1$) corresponding to the actual EOF event (point 46) until later, at point 60 when the time=$t_3$, whereas the predicted EOF event occurs earlier at point 46, when the time=$t_2$. In such an underfill event, the pressure control system is unresponsive to the commanded pressure in the Torque Phase (Phase II), and the actual clutch apply pressure may increase abruptly at the actual EOF event (point 60) and overshoot the desired clutch apply pressure $P_1$, as represented by the step curve of the line 45. Therefore, as indicated above, the method or algorithm 100 of FIG. 5 accounts for this step in actual clutch apply pressure.

In special cases, return springs (not shown) may be provided having a flat force versus a stroke curve, and the required EOF pressure ($P_1$) will be reached near the beginning of the fill, and held relatively constant throughout the fill phase. In these cases, as with other unique springs, the determination of an underfill event will be based on the response of the clutch after the calculated EOF. The open loop part of the algorithm 100 of FIG. 5 is adaptable for the unique system characteristics and thresholds will be understood by those of ordinary skill in the art.

Referring to FIG. 5, similarly to large closed-loop errors generated during active fill events, large pressure steps are also sometimes required for clutch control, such as shown for a representative offgoing clutch during an upshift event. In such cases, in order to prevent excessive closed-loop error, improve responsiveness, and to compensate for large overshoot or undershoot conditions with respect to an actual clutch pressure, the method or algorithm 100 (see FIG. 6) selectively executes or switches to or between a set of open-loop pressure controls or control parameters, and fine tunes the final pressure level using closed-loop pressure control, such as by toggling between open-loop controls and closed-loop controls as needed.

For example, in FIG. 5 the commanded clutch pressure (line B) drops or steps down from a pressure level $P_4$ at point 50 to a pressure level $P_3$ at point 51. By recognizing and monitoring this rapid drop in pressure, such as by using the sensor 25 (see FIG. 1), and switching to open-loop pressure controls as rapidly as possible upon such detection, the actual offgoing clutch pressure (line 43C) closely follows the step until reaching point 52. At point 52, as shown by line 43D, using only closed-loop pressure controls a large error will cause the closed-loop algorithm to take excessive corrective steps, resulting in a relatively large undershoot due to the large error. By operating first using open-loop controls, sensing the "crossover" at point 52, and immediately switching to closed-loop pressure controls upon such detection, the large undershoot is minimized. The switching point could be a simple threshold value, or could be modeled based on various system characteristics used in conjunction with the sensor 25

(see FIG. 1). As discussed above, one may also toggle between closed-loop pressure controls and open-loop pressure controls after point 52 as necessary to closely match the commanded clutch pressure (line B).

Figure 6:
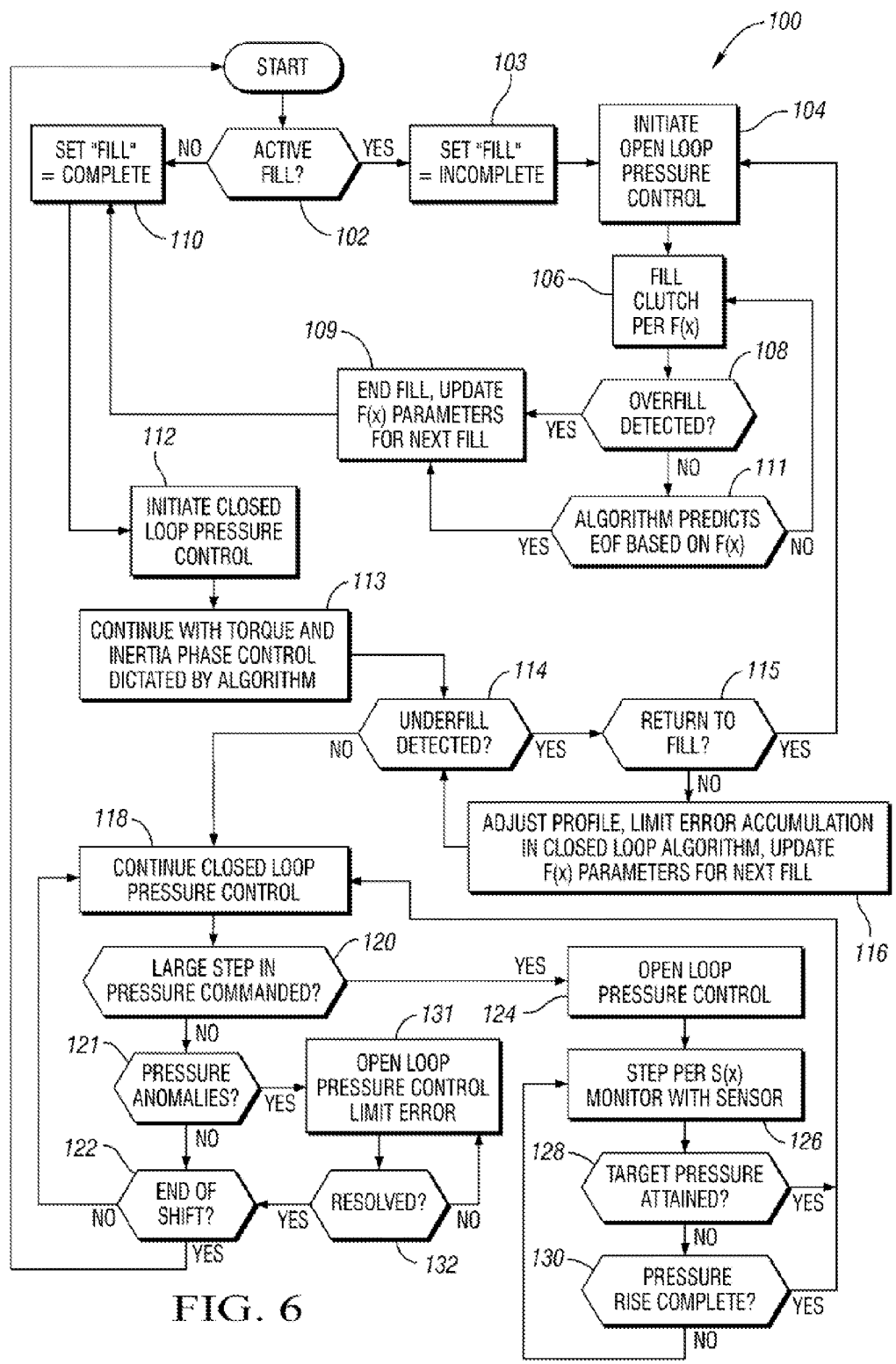
FIG. 6 is a schematic flow chart describing the method or algorithm of the invention.

Referring to FIG. 6, the method or algorithm 100 of the invention provides a method for optimizing the performance of a clutch assembly, such as the clutch assembly 10 of FIG. 1, by switching between or selectively using open-loop and closed-loop pressure controls, with the choice of control logic depending on the detected shift phase of the clutch assembly 10. The algorithm 100 begins at step 102, and detects or otherwise determines the presence of a shift phase of the clutch assembly 10 in order to determine the presence of an active fill phase, as that event is described previously hereinabove. If an active fill phase is detected at step 102, or alternately a learning fill phase as might occur during production of a vehicle having a clutch assembly 10 (see FIG. 1), then the algorithm 100 proceeds to step 103. Otherwise, the algorithm proceeds to step 110.

At step 103, after determining at step 102 that an active clutch fill event is not occurring, the algorithm 100 sets a "fill" flag to "incomplete", or otherwise records that an active fill condition is active and ongoing. The algorithm 100 then proceeds to step 104.

At step 104, the algorithm 100 switches to or otherwise initiates a first set of open-loop pressure control logic or pressure controls, departing from whatever control logic or control methodology is currently being used to control the active fill phase. Once the algorithm 100 has switched to or otherwise initiated the first set of open-loop control logic, it proceeds to step 106.

At step 106, in the case of an oncoming clutch, the algorithm 100 fills the clutch assembly 10 (see FIG. 1), i.e. ramps the actual clutch fill pressure according to a predetermined, stored, and/or otherwise accessible set of clutch fill parameters, or F(x). The clutch fill parameters F(x) may include such variables as a clutch fill pressure, fill time to substantially fill a particular clutch volume, and/or a required flow rate of the pressurized fluid (arrow F of FIG. 1), such that the set of clutch fill parameters F(x) sufficiently defines or describes the clutch fill event. This set of clutch fill parameters F(x) is then stored for future access by the algorithm 100 as needed in controlling subsequent active clutch fill events. The algorithm 100 then proceeds to step 108.

At step 108, while the clutch fill event remains active, the algorithm 100 monitors the various clutch fill parameters F(x) and an actual fill pressure (for example, line 43A of FIG. 3), and compares the two to detect a condition that may be indicative or representative of an overfill condition as shown in FIG. 3, i.e. an unexpected pressure rise as detected by the sensor 25 (see FIG. 1) indicating an actual fill pressure value that exceeds a commanded fill pressure value by a predetermined amount. If an overfill event is detected at step 108, the algorithm 100 proceeds to step 109. Otherwise, the algorithm 100 proceeds to step 111.

At step 109, the algorithm 100 ends the active fill event, and then updates the values for the clutch fill parameters F(x) as needed based on the completed clutch fill event. The updated clutch fill parameters F(x) are stored or recorded for use by the controller 17 (see FIG. 1) in the next active fill event. The algorithm 100 then proceeds to step 110.

At step 110, having determined at step 102 that an active clutch fill event is not occurring, the algorithm 100 sets a "fill" flag to "complete", or otherwise records that an active fill condition is not active or ongoing. The algorithm 100 then proceeds to step 112.

At step 111, having not detected an overfill event at step 108, the algorithm 100 next predicts an expected end-of-fill (EOF) event based on the clutch fill parameters F(x). Typically, the EOF event (see point 46 of FIGS. 3 and 4) is determined via a timer, with the valve 25 (see FIG. 1) held open for a predetermined duration to achieve the fill, as long as a spike in clutch pressure is not detected. If an EOF event is predicted at step 111, the algorithm 100 proceeds to step 109. Otherwise, the algorithm 100 returns to step 106.

At step 112, after the fill was set to "complete" at step 110, the algorithm 100 initiates or switches to a first set of closed-loop control logic or pressure controls, and proceeds to step 113.

At step 113, the algorithm 100 continues to control the operation of the clutch assembly 10 (see FIG. 1) in the torque phase (Phase II of FIG. 2) and the inertia phase (Phase III of FIG. 2) as required, and proceeds to step 114.

At step 114, while operating according to the first set of closed-loop pressure controls in the torque phase (Phase II of FIG. 2) and the inertia phase (Phase II of FIG. 2), the algorithm 100 then determines or detects an underfill condition, as shown in FIG. 4. That is, the algorithm 100 determines or detects whether the response in the torque or inertia phases is insufficient with respect to a commanded change of clutch apply pressure after a completed clutch fill event. If the algorithm 100 detects or otherwise determines the presence of an underfill condition, the algorithm 100 proceeds to step 115, otherwise the algorithm 100 proceeds to step 118.

At step 115, the algorithm 100 determines whether it is required to re-enter the fill phase to finish filling the clutch. If so, the algorithm 100 returns to step 104. Otherwise, the algorithm 100 proceeds to step 116. In returning to step 104, a larger transmission control algorithm 200 (see FIG. 1) may adjust the value of at least one of the variables within the set of clutch fill parameters F(x) as needed, such that the clutch fill event continues at a potentially different fill rate.

At step 116, the algorithm 100 adjusts the clutch fill profile by adjusting the stored set of clutch fill parameters F(x) for the subsequent shift events, and potentially the commanded pressure profile in the torque and inertia phases (Phases II and III of FIGS. 2, 3, and 4) in order to account for the underfilled clutch. The algorithm 100 is operating according to the first set of closed-loop pressure controls, and limits the error accumulation in this closed-loop portion of the algorithm 100 until the underfill condition is no longer detected. As will be understood by those of ordinary skill in the art, unexpected or excessive values may affect the accuracy of any closed-loop pressure controls and may induce control instabilities, pressure overshoots, and/or pressure undershoots, and therefore step 116 is included to properly limit and/or compensate for such values, for example by setting a permissible or threshold range of values, caps, etc. to limit the error-adjustment range of the closed-loop pressure controls. The algorithm 100 then returns to step 114.

At step 118, the algorithm 100 continues with the closed-loop pressure controls or control logic. Step 118 represents a steady-state in which closed-loop controls logic are the default controls methodology for all shift phases subsequent to the active fill phase. The algorithm 100 operates hereafter in a closed-loop pressure control absent a detected commanded large step, i.e. a commanded pressure step exceeding a threshold pressure step, as described at steps 120-130. The algorithm proceeds to step 120.

At step 120, the algorithm 100 detects a large step in commanded clutch apply pressure, as required by the transmission control algorithm 200 (see FIG. 1), i.e. a control algorithm that generates the commanded shift pressure, to complete the shift. If such a step is detected, the algorithm 100 proceeds to step 124. Otherwise, the algorithm 100 proceeds to step 121.

At step 121, the algorithm 100 monitors the actual pressure for large pressure anomalies, deviations from the commanded pressure, and/or instabilities using the sensor 25 (see FIG. 1). If such anomalies are detected, the algorithm 100 proceeds to step 131, otherwise the algorithm 100 proceeds to step 122.

At step 122, the algorithm 100 determines whether an actual end-of-shift event has occurred. If the end-of-shift event is detected or determined, the algorithm 100 ends active pressure control and returns to start for the next shift event. Otherwise, the algorithm 100 returns to step 118.

At step 124, having detected or otherwise determined the presence of a large step in commanded pressure at step 120, the algorithm 100 then initiates or switches to a second set of open-loop pressure controls or control logic, and proceeds to step 126.

At step 126, the algorithm 100 monitors the step, i.e. S(x) of FIG. 5, while operating according to the second set of open-loop step controls initiated at step 124. The pressure is monitored using the sensor 25 (see FIG. 1) to determine when a target pressure dictated by S(x) is reached, or when a predetermined amount of time has passed to achieve the target pressure. The algorithm 100 proceeds to step 128.

At step 128, the algorithm 100 determines whether the target pressure determined at step 126 has been reached or attained. If it has been attained, the algorithm 100 returns to step 118. Otherwise, the algorithm 100 proceeds to step 130.

At step 130, having determined at step 128 that the target pressure of S(x) has not been attained, the algorithm 100 detects or otherwise determines whether the pressure rise or fall is complete, i.e. whether the duration required for achieving the target pressure of S(x) has passed, or the rate of pressure rise has fallen to a calibratable level. If so, regardless of whether the target pressure has actually been attained, the algorithm 100 returns to step 118. If not, the algorithm repeats step 126. While the majority of the algorithm 100 describes an oncoming clutch element for an upshift event, those of ordinary skill in the art will recognize that similar progressions will occur for offgoing clutch elements as well as other shift events, i.e. downshifts, garage shifts, etc.

At step 131, having detected pressure anomalies at step 121, the algorithm 100 may again execute or switch to another control strategy or an anomaly correction method in order to mitigate any excessive error in the control loop. The anomaly correction method may include, for example, executing another set of open-loop pressure controls, limiting the accumulation of error, or requesting alternative profiles from the transmission control algorithm 200 (see FIG. 1) in order to sufficiently control or mitigate any pressure anomalies. The algorithm 100 then proceeds to step 132.

At step 132, the algorithm 100 determines if the pressure anomaly has been properly resolved at step 131. If so, the algorithm 100 returns to step 122. Otherwise, the algorithm 100 repeats step 131 in a loop until properly resolved.

While the best modes for carrying out the invention have been described in detail, those familiar with the art to which this invention relates will recognize various alternative designs and embodiments for practicing the invention within the scope of the appended claims.

The invention claimed is:

1. A method for controlling a clutch assembly, the method comprising:
   detecting an active fill phase of the clutch assembly;
   controlling an actual fill pressure for the clutch assembly using a first set of open-loop control logic when said active fill phase is detected;
   detecting an actual end-of-fill (EOF) event representing a completion of said active clutch fill phase;
   detecting a step in a commanded clutch pressure after said actual EOF event is detected;
   comparing said detected step to a threshold value;
   determining a predicted EOF event representing a required EOF pressure; and
   controlling an actual clutch pressure to the clutch assembly using closed-loop control logic when one of said actual EOF event is detected and said predicted EOF event is determined, including supplying said actual clutch pressure according to a second set of open-loop control logic when said detected step exceeds said threshold value.

2. The method of claim 1, further comprising:
   monitoring another fill pressure and a corresponding fill time to the clutch assembly during said detected step in said commanded clutch pressure; and
   supplying said actual clutch pressure according to said first set of open-loop control logic until at least one of said monitored fill pressure and said corresponding fill time equals a corresponding predetermined value; and
   supplying said actual clutch pressure using said closed-loop control logic after at least one of said another fill pressure and said corresponding fill time equals said corresponding predetermined value.

3. The method of claim 1, further comprising:
   detecting an overfill condition of the clutch assembly;
   ending said active fill phase when said overfill condition is detected; and
   updating a set of clutch fill parameters for controlling a subsequent active fill phase;
   wherein said updating a set of clutch fill parameters includes adjusting at least one of a fill pressure and a fill time of the clutch assembly for said subsequent active fill phase.

4. A method for optimizing a performance of a clutch assembly, the method comprising:
   controlling an actual clutch pressure according to a set of clutch fill parameters during an active fill phase of the clutch assembly, said set of clutch fill parameters defining a first set of open-loop pressure control variables;
   detecting a presence of an actual end-of-fill (EOF) condition representing an end of said active fill phase;
   determining a predicted end-of-fill (EOF) condition during said active fill phase;
   switching from said set of clutch fill parameters to closed-loop pressure controls in response to one of said actual EOF condition and said predicted EOF condition;
   detecting a step in a commanded clutch pressure during one of a torque phase and an inertia phase of the clutch assembly after said actual EOF condition is detected;
   comparing a magnitude of said detected step to a magnitude of a threshold value;
   switching from said closed-loop pressure controls to a second set of open-loop control pressure control variables when said step magnitude exceeds said threshold value magnitude;
   ramping said actual clutch pressure to a predetermined level; and
   switching from said second set of open-loop control variables to said closed-loop pressure controls when said actual clutch pressure reaches said predetermined level.

5. The method of claim 4, further comprising:
   detecting an underfill condition of the clutch assembly; and continuously updating said actual clutch pressure using said closed-loop pressure controls when said underfill condition is detected.

6. The method of claim 4, further comprising:
detecting an overfill condition of the clutch assembly; and
continuously updating said actual clutch pressure using said closed-loop pressure controls when said overfill condition is detected.

7. The method of claim 4, wherein said predetermined level is selected from the group consisting of a first level corresponding to a target pressure level and a second level corresponding to a duration of said detected step.

8. The method of claim 4, wherein said detecting a step in commanded pressure includes using a pressure sensor to directly detect said step.

9. The method of claim 4, further comprising:
comparing said actual clutch pressure to said commanded clutch pressure during one of said torque phase and said inertia phase of the clutch assembly to thereby detect a pressure anomaly;
correcting said pressure anomaly using a predetermined anomaly correction method selected from the group consisting of switching to a third set of closed-loop control variables, requesting a corrective action from a transmission control algorithm, and limiting an error accumulation within said closed-loop pressure controls; and
switching from said predetermined anomaly correction method to said closed-loop pressure controls when said pressure anomaly is corrected.

10. A clutch assembly comprising:
at least one clutch pack having a plurality of clutch disks;
an apply piston operable for compressing said plurality of clutch disks to initiate a shift event;
a controller configured to control said shift event through a plurality of shift phases including an active fill phase, a torque phase, and an inertia phase; and
at least one sensor configured to determine an actual clutch pressure during each of said plurality of shift phases;
wherein said controller is configured to switch between a set of closed-loop pressure controls and first and second sets of open-loop pressure controls by:
detecting said active fill phase;
controlling an actual fill pressure for the clutch assembly using said first set of open-loop pressure controls when said active fill phase is detected;
detecting an actual end-of-fill (EOF) event representing a completion of said active fill phase;
detecting a step in a commanded clutch pressure after detection of said actual EOF event;
comparing said detected step to a threshold value;
determining a predicted EOF event representing a required EOF pressure; and
controlling an actual clutch pressure to the clutch assembly using said set of closed-loop pressure controls when one of said actual EOF event is detected and said predicted EOF event is determined, including supplying said actual clutch pressure using said second set of open-loop pressure controls when said step exceeds said threshold value.

11. The clutch assembly of claim 10, wherein said controller is configured to calculate a set of clutch fill parameters including at least one of a flow rate of a pressurized fluid into said clutch assembly, said actual clutch pressure, and a time required for filling said clutch assembly with said pressurized fluid.

12. The clutch assembly of claim 11, wherein said controller is configured to control said shift event using one of said first and second sets of open-loop pressure controls in response to detecting at least one of said active fill phase, an underfill condition of said clutch assembly, and a step in a commanded clutch pressure;
wherein said at least one sensor is operable for directly detecting said active fill phase, said underfill condition, and said step.

13. The clutch assembly of claim 12, wherein said controller is configured to switch from said second set of open-loop pressure controls to said closed-loop pressure controls in response to at least one of a completion of said active fill phase and detection of said torque phase.

* * * * *